United States Patent [19]

Plasek

[11] 4,327,290
[45] Apr. 27, 1982

[54] METHOD AND APPARATUS FOR NUCLEAR WELL LOGGING WITH OPTIMIZED TIMING FOR SIMULTANEOUS MEASUREMENT OF THERMAL NEUTRON DECAY TIME AND GAMMA RAY PULSE HEIGHT SPECTRA

[75] Inventor: Ronald E. Plasek, Houston, Tex.

[73] Assignee: Schlumberger Technology Corp., Houston, Tex.

[21] Appl. No.: 90,800

[22] Filed: Nov. 2, 1979

[51] Int. Cl.³ .............................................. G01V 5/00
[52] U.S. Cl. ................................... 250/262; 250/270
[58] Field of Search ........................ 250/270, 269, 262

[56] References Cited

U.S. PATENT DOCUMENTS

Re. 28,477  7/1975  Nelligan ............................... 250/262
3,662,179   5/1972  Frentrop et al. ..................... 250/269
4,055,763  10/1977  Antkiw ................................ 250/270

Primary Examiner—Alfred E. Smith
Assistant Examiner—Carolyn E. Fields

[57] ABSTRACT

The invention relates to a novel method and apparatus for the cyclical timing of the neutron bursts, spectral gates, tau determination gates, and background measurement periods in a capture spectroscopy measurement. Each measurement cycle period is divided in time into 62 tau units, where tau is the thermal decay time constant determined from the immediately preceding cycle period. The neutron accelerator bursts eight times, each burst lasting for one tau unit and beginning at 0, 6, 12, . . . 42 taus. The capture spectral gates, two units long, follow each neutron burst after a one tau unit long delay. Spectral background due to activation is measured in a long background window until tau equals 61, following a two tau delay from the eighth spectral gate and, properly normalized, is subtracted on a channel-by-channel basis from the spectrum accumulated from the capture spectral gates. Tau determination gates I and II follow each neutron burst after a two tau delay. Each gate I is one tau long; each gate II immediately follows gate I and is two tau long. After the eighth gate II, a long gate III (49 tau to 61 tau) is provided for correcting background counts in the tau determination gates I and II.

40 Claims, 5 Drawing Figures

METHOD AND APPARATUS FOR NUCLEAR WELL LOGGING WITH OPTIMIZED TIMING FOR SIMULTANEOUS MEASUREMENT OF THERMAL NEUTRON DECAY TIME AND GAMMA RAY PULSE HEIGHT SPECTRA

BACKGROUND OF THE INVENTION

1. Field of the Invention

The present invention relates to improved methods and apparatus for concurrently providing thermal neutron capture gamma-ray spectroscopy measurements and thermal neutron decay time measurements.

2. The Prior Art

U.S. Pat. No. 4,055,763, issued Oct. 25, 1977, to Stephen Antkiw and assigned to the assignee of the present application, discloses a combined thermal neutron capture gamma-ray spectroscopy and decay time (tau) tool in which the timing of the neutron bursts and the gating of the gamma-ray detection periods, both for the spectroscopy measurements and the decay time measurements, are automatically controlled as a function of the real-time-measured value of the decay time. Although the Antkiw tool affords significant advantages over earlier spectroscopy and deacy time measurement apparatus and techniques, it is desirable to provide still further improvements in the making of such combined spectroscopy and decay time measurements. In particular, it has been found that the apparatus as described in the Antkiw patent yielded tau measurements which may be considerably improved statistically with the methods and apparatus of the present invention.

Improvements in the measurement precision of tau result in optimal placement of the detection periods for the spectroscopy measurements.

SUMMARY OF THE INVENTION

It is an object of the invention to provide improved nuclear logging methods and apparatus, which afford more precise data as to surrounding formations.

It is another object of this invention to provide nuclear logging methods and apparatus which more precisely indicate neutron characteristics indicative of the content of surrounding formations traversed by a well bore, cased or open hole.

Yet another object of the invention is to provide logging methods and apparatus that yield more precise gamma-ray energy spectra of earth formations surrounding a borehole.

Still another object of the invention is to provide methods and apparatus for improved thermal neutron decay time (tau) determinations and improved capture gamma-ray spectra by repeatedly irradiating the surrounding formation with a neutron burst followed by tau determination gates, and determining the thermal neutron decay time (tau) from detections during a number of burst-gate sequences.

In accordance with the invention, the precision of the tau determination is improved in tau and gamma-ray spectra well logging. Determination of tau is improved by providing a different basic cycle of longer duration during which a plurality of neutron bursts takes place. Each burst is followed by a set of tau determination gates or windows, I and II. These gates I and II occur during the capture-gamma decay period following each burst. Gamma-ray detections accumulated during tau gates I and II are corrected for background gamma-ray counts, detected during a long background tau gate III. The multiple I, II gates give a more precise measure of tau.

According to the invention, each measurement cycle period is divided in time into 62 tau units, where tau is the thermal decay time constant determined from the immediately preceding cycle period. The neutron accelerator bursts eight times, each burst lasting for one tau unit and beginning at 0, 6, 12, . . . 42 tau. The capture spectral gates, two units long, follow each neutron burst after a one tau unit long delay. Spectral background due to activation is measured in a long background window until time equals 61 tau, following a two tau delay from the eighth spectral gate and, properly normalized, is subtracted on a channel-by-channel basis from the spectrum accumulated from the capture spectral gates.

Tau determination gates I and II follow each neutron burst after a two tau delay. Each gate I is one tau long; each gate II immediately follows gate I and is two tau long. After the eighth gate II, a long gate III (49 tau to 61 tau) is provided for correcting background counts in the tau determination gates I and II.

DESCRIPTION OF THE INVENTION

FIGS. 1-5 illustrate, schematically, the invention, radioactivity well logging apparatus and method, which more precisely measure thermal decay time (tau), and by using a more precisely determined tau, produce optimal spectral analysis. It should be understood that additional circuits, programs and components for detecting other parameters of a formation may be combined with the specific arrangement discussed hereinbelow. For example, means for deriving macroscopic thermal neutron capture cross-section, and circuitry and means to detect inelastic gamma-ray spectra are known and may be incorporated in a system according to the present invention. For clarity of description of the present invention, no further discussion of these additional measurements is presented here. Furthermore, although the invention is illustrated in a cased hole without production tubing, the invention is equally useful in open holes and where production tubing is employed.

Figure 1:
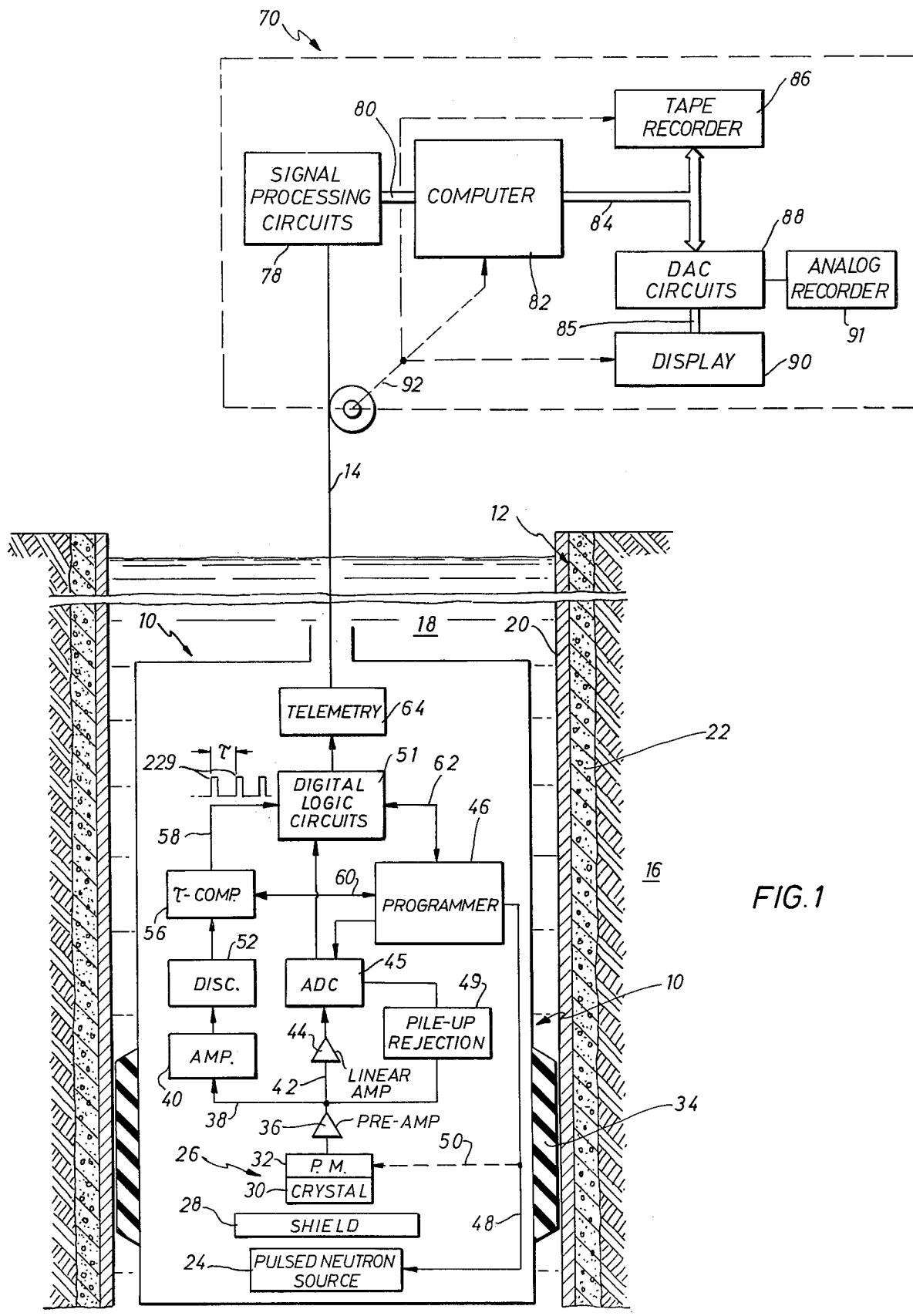
FIG. 1 illustrates schematically the apparatus of the invention in a well bore environment.

Referring now to FIG. 1, the invention includes a fluid-tight, pressure-resistant well tool 10 that is adapted to be suspended in a well bore 12 by an armored logging cable 14 for investigating subsurface earth formations 16. The well bore 12 is illustrated as containing a well fluid 18, and as including a steel casing 20 with a surrounding annulus of cement 22, but could be as well an open borehole.

The well tool 10 includes a pulsed neutron source 24 and a radiation detector 26 axially spaced from the source 24. A neutron shield 28 of conventional composition is positioned between the source 24 and the detector 26 to reduce direct neutron irradiation of the detector. The neutron source 24 is adapted to generate discrete pulses of fast neutrons, e.g., 14 MeV, and suitably may be of the types described in more complete detail in U.S. Pat. No. 2,991,364 to C. Goodman, dated July 4, 1961, and U.S. Pat. No. 3,456,512, granted to A. H. Frentrop on Dec. 8, 1970, both of which are assigned to the assignee of this application. The detector 26 may be of any construction appropriate for the detection of gamma rays and to the production of a pulse signal in response to each detected gamma ray having an amplitude representative of the energy of the gamma ray. It typically includes a scintillation crystal 30 which is optically coupled in conventional fashion to a photomultiplier tube 32. The crystal 30 preferably is of the thallium-activated sodium iodide type, although any suitable crystal, such as thallium- or sodium-doped cesium iodide, may be used. Alternatively, a solid state detector, having, for example, a germanium crystal (of either the high-purity or lithium-doped type) might be employed. Power for the well tool 10 is supplied over the cable 14 from a surface power source (not shown), and it will be understood that the suitable power sources (not shown) are included in the tool 10 to power the neutron source 24, detector 26 and other well tool equipment and circuitry.

A boron-carbide impregnated sleeve 34 surrounds the tool 10 in the region of the source 24 and the detector 26. The sleeve is slotted longitudinally to allow passage of well fluid along the tool and preferably is as large in diameter as is commensurate with free movement of the tool within the casing 20. The sleeve 34 reduces the number of undesired gamma rays reaching the detector 26 in several ways; it displaces the well fluid 18 from the vicinity of the tool, thereby minimizing gamma rays originating from neutron interactions with the well fluid, and also acts as a sink for thermal neutrons in the immediate region of the detector, so as to reduce gamma rays arising from neutron interactions with the tubing or casing, or from the activation of iron and other elements in the tool itself.

Pulses from the photomultiplier 32 are amplified in a preamp 36 and then applied, on the one hand, over a lead 38 to the input of an amplifier 40, for use in the derivation of tau, and, on the other hand, over a lead 42 to the input of a linear amplifier 44, for spectral analysis. If desired, separate detectors may be employed for the tau and spectroscopy functions. If so, the spectroscopy-related detector should be of the gamma-ray energy-responsive type, as described, but the tau-related detector need not be; for example, the tau-related detector could be of the thermal neutron-sensitive type, such as a helium-3 filled proportional counter.

Amplified pulses representative of gamma-ray spectra are applied from the linear amplifier 44 to an analog-to-digital converter (ADC) 45. During and immediately after a neutron pulse is generated by the source 24, an extremely high incidence of gamma rays occurs at the detector 26, which produces a correspondingly high rate of pulses in the photomultiplier 32 and ADC 45. If gamma radiation during this period is not to be measured, the photomultiplier may be blocked during the pulse and for a short period thereafter. A connection 50 is shown diagrammatically to indicate this capability.

Pile-up rejection circuitry 49 is connected in parallel with the linear amplifier 44 to reduce the random pulse pile-up due to the relatively high gamma-ray flux during the spectral gates. From the analog-to-digital converter 45, the digitized capture gamma-ray spectra are applied to digital logic circuits 51 for transmission via suitable telemetry system 64 via the logging cable 14.

Gamma ray pulses applied by the lead 38 to the amplifier 40 for use in tau computation are amplified and then applied to a discriminator 52. The discriminator passes only detection pulses exceeding a preselected amplitude, converts them to standard size, and applies them to tau computation circuitry 56. Pulses spaced one tau apart are applied via a conductor 58, to the digital logic circuits 51, where they are counted, digitized, and sent uphole. Bidirectional digital communication lines, as shown at 62, communicate between the digital logic circuits 51 and the programmer 46. The digital logic circuitry addresses the programmer, as explained below in more detail. In the other direction, the programmer can advise the digital logic circuitry when it is at the end of its program and needs to start over. It can also tell the digital logic circuits where, in memory, to store each gamma ray event, again as discussed below in connection with FIG. 4.

The tau computation results, in the form of tau-spaced pulses, are transmitted as well to the programmer 46 via a lead 60. These pulses are used by the programmer 46 to control via lead 48 the timing and duration of each of the fast neutron pulses from the source 24, to control the gates for capture gamma ray spectral detection, and via lead 60, to control the gates for the tau-computation.

The processing and driver circuits of the telemetry 64 may be of any conventional construction for encoding, time division multiplexing, or otherwise preparing the data-bearing signals applied to them in a desired manner and for impressing them on the cable 14. Although the specific forms of the circuits employed for these purposes do not characterize the present invention, preferred constructions of suitable telemetry and circuits are described and illustrated in the copending, commonly-owned U.S. patent application Ser. No. 872,504, filed Jan. 26, 1978, abandoned, for "Well Logging Communication System". The pertinent portions of that application are incorporated herein by reference. Suitable telemetry circuits are also disclosed in Nelligan U.S. Pat. No. 4,012,712 and the relevant portions of that patent are also incorporated herein by reference.

At the earth's surface, at a station 70, signals on the cable 14 applied by the telemetry 64 are processed at signal processing circuits 78, again in accordance with the disclosure of the aforementioned U.S. application Ser. No. 872,504, and applied to a computer 82 via a conductor bundle 80. The computer develops digital descriptions of one or both of sigma ($\Sigma$) and tau and of the desired spectroscopy-related outputs, such as, for example, values indicative of water saturation, shaliness, lithology, porosity, water salinity, etc. Preferred forms of the spectroscopy outputs are described in the above-mentioned Antkiw patent. The digital representations of these calculations are transmitted via a conductor bundle 84 to a tape recorder 86 for digital recording and to digital to analog converter (DAC) circuits 88 for analog display via display unit 90 which may be a cathode ray tube or to an analog recorder unit 91 which may be a camera or electrostatic recorder. The tape recorder 86, display unit 90 and the analog recorder 91 are conventional units and produce the customary record of logging signals as a function of tool depth. The usual cable-following mechanical linkage, indicated diagrammatically at 92 in FIG. 1, is provided to drive both the tape recorder and display unit to record data as a function of tool depth.

The computer 82 may take any construction appropriate to the computation of tau and sigma, and the spectrum matching, constituent proportions determination, and ratio forming procedures are consistent with the aforementioned Antkiw patent, the pertinent portions of which are incorporated herein by reference. To the extent that the Antkiw patent follows the disclosures in these respects of the Nelligan U.S. Pat. No. 3,566,116 (now U.S. Pat. No. 28,477) and the Moran et al U.S. Pat. No. 3,521,064, the pertinent portions of those patents are also incorporated herein. For example, the computer 82 may comprise a general purpose digital computer of the type manufactured by Digital Equipment Corporation, Maynard, Mass., under the designation PDP-11.

Figure 2:
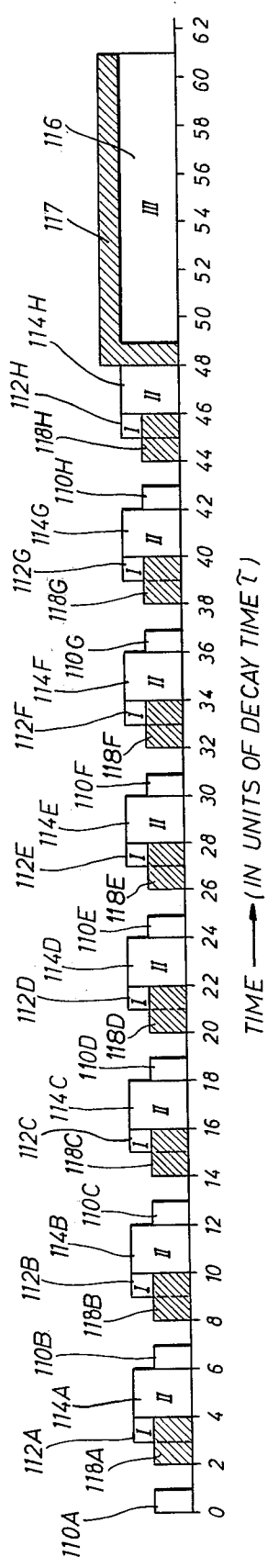
FIG. 2 illustrates the tau determination and capture gamma spectroscopy cycle according to the invention.

A preferred tau determination and capture gamma-ray spectroscopy cycle according to the invention is depicted schematically in FIG. 2. In the preferred embodiment of the invention, the cycle period, measured in units of decay time tau, is 62 tau long. The 62 tau cycle provides 8 neutron bursts 6 tau apart. These bursts are numbered 110A-110H in FIG. 2, beginning at 0, 6, 12, 18 . . . 42 tau. Tau gate I periods are numbered 112A-H, and tau gate II periods are numbered 114A-H. Tau gates I are 1 tau long, and each commences 2 tau after a preceding burst 110. Tau gates II are 2 tau long, beginning immediately at the end of each tau gate I. A final tau-determination gate III 116 is provided as a background gate following the last neutron burst by 6 tau and continuing for 12 tau, thus starting at 49 tau and ending at 61 tau.

Following each neutron burst, a capture spectroscopy gate of 2 tau duration commences after a 1 tau delay. These begin at 2 tau, 8 tau, 14 tau . . . 44 tau. Following the final burst 110H, a long spectral background gate 117 of 13 tau duration is provided beginning at 48 tau, 5 tau after the final burst, and ending at 61 tau. Spectral background counts collected during gate 117 are subtracted from the capture spectra determined during the capture spectral gates, thereby eliminating close spectral interference between activation (background) and capture gamma rays. For example, this process eliminates interference in the final spectra between activation gamma rays for oxygen at 6.130 MeV and capture gamma rays for chlorine at 6.111 MeV.

Pulses detected during the I, II, and III tau determination gates of the 62 tau cycle are forwarded to the tau computation circuitry 56 by the discriminator 52. The tau computation circuitry proceeds to compute tau, as described more fully hereinafter, by determining a net number N of counts as a function of the accumulated counts in gates I and II and from the background counts of gate III, $$N = \frac{N_I}{2} - N_{II} + N_{III} \quad (1)$$

where:

$N_I$ is the number of counts detected and accumulated during the first detection intervals or gates I;

$N_{II}$ is the number of counts detected and accumulated during the second detection intervals or gates II; and $N_{III}$ is the number of counts during the single third background interval or gate III.

$N_{III}$, the background count, is determined to correct the counts $N_I$ and $N_{II}$ from the principal intervals I and II, respectively, for background gamma radiation, and therefore may be omitted when the tau-related detector is not sensitive to gamma radiation.

If the solution of equation (1) indicates that N=0, the apparent value of the decay time derived by the circuits 56 may be taken as the actual decay time of the formation under investigation. If N departs from 0, the tau determination circuit 56 automatically adjusts the period between the tau-spaced output pulses on conductors 58 by an amount and in the direction (shorter or longer) to restore the N=0 condition in a manner described more fully hereinafter.

As taught by the aforementiond Antkiw and Nelligan patents, the 2 tau delay after the neutron pulse, before the beginning of the tau-determination gate I, eliminates from the tau determination counts most of the undesirable borehole effects (illustrated as region 119 of FIG. 3), e.g., arising from neutron interactions with materials in the immediate vicinity of the neutron source 24 and the detector 26 such as the tool housing, the well fluid 18, the casing 20 and the cement annulus 22.

Figure 3:
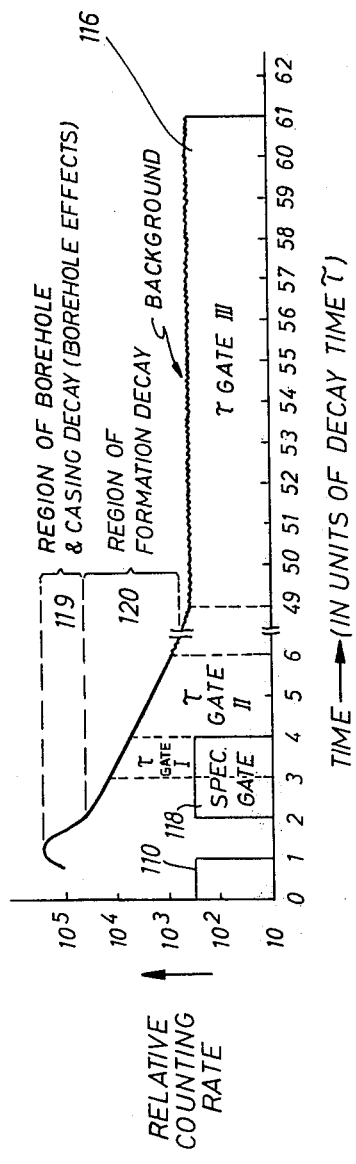
FIG. 3 shows the thermal neutron decay characteristic following a neutron burst and illustrates regions of borehole effects, formation decay and background counts.

FIG. 3 graphically illustrated the diminution of thermal neutron capture gamma-ray detection counts with time (in units of tau) relative to a neutron burst 110 and plotted on a semilog scale of counts versus time (in units of tau). Tau determination gates I and II are placed in time to occur in the region of the curve 120 that corresponds to exponential decay of the capture gamma radiation of the formation being investigated. The tau determination gate III 116 or background gate is placed in time, e.g., 6 tau after the 8th pulse (FIG. 2 and FIG. 3), such that substantially only background radiation contributes to the counts detected.

Antkiw indicates that for capture gamma spectroscopy purposes, it has been found that a spectroscopy detection period, designated 118 in FIG. 3, of 2 tau duration beginning after a delay of 1 tau following the termination of the preceding neutron pulse 110 substantially reduces early borehole effects and affords high counting rates for improved statistics. Because the timing and duration of the spectroscopy detection period is thus also keyed to the measurement of tau, the greater reliability afforded by the increased number of tau determination gates I and II will result in more accurate placement of the spectroscopy gates or windows and better spectroscopy data for study of the spectroscopy-related characteristics of the formation.

As illustrated in both FIGS. 2 and 3, the duration of the neutron bursts are each 1 tau long. This duration, too, is a result of the determination of tau that is made by the tau computation circuit 56 and programmer 46 of FIG. 1. The programmer 46 controls the duration and pulse-to-pulse timing of the neutron bursts based on the tau-spaced output pulses of the tau computation circuits 56.

The 62 tau cycle as illustrated in FIG. 2 is successively repeated as the tool is moved through the well bore. The decay time is repeatedly determined by the tau computation circuit 56, and under the control of the programmer 46, the times of occurrence of the neutron pulses, the tau detection intervals I, II and III, and the spectroscopy detection periods, 118A-118H, are adjusted in accordance with the measured value of tau for the earth formation traversed.

The tau measurement and capture gamma-ray spectroscopy functions of the tool 10 are instituted and controlled by programmable read only memories (PROM's) located down-hole in the programmer 46. Instructions to begin programs therein are generated at the surface station 70 and sent as commands via the logging cable 14 and telemetry 64. The digital logic circuits 51 have command reception, decoding, and storage capability. The memories of the digital logic circuits 51 provide down-hole accumulation of up to four, 256-channel×8-bit pulse height spectra. The memory is a random access memory (RAM) which, typically, is read out by the telemetry 4 times per second, at 60 frames per second. As will be apparent to those skilled in the art, a buffered interrupt structure can be employed to resolve the situation wherein the digital logic circuits and its memory are being addressed simultaneously for read-out to the above-ground station and for spectra accumulation. Likewise, suitable multiplexing by the telemetry 64 for transmission on the cable 14 will be apparent. The commonly assigned U.S. patent application Ser. No. 872,504, abandoned, filed Jan. 26, 1978, for "Well Logging Communication System" describes suitable telemetry circuits, and its disclosures are incorporated herein by reference.

Although the logging tool 10 may have many circuits addressed by surface commands, such as power supply activation, monitoring and voltage correction, neutron source enablement, inelastic spectra detection programs, and the like, only those commands relevant to tau and capture gamma spectroscopy programs are discussed here.

Figure 4:
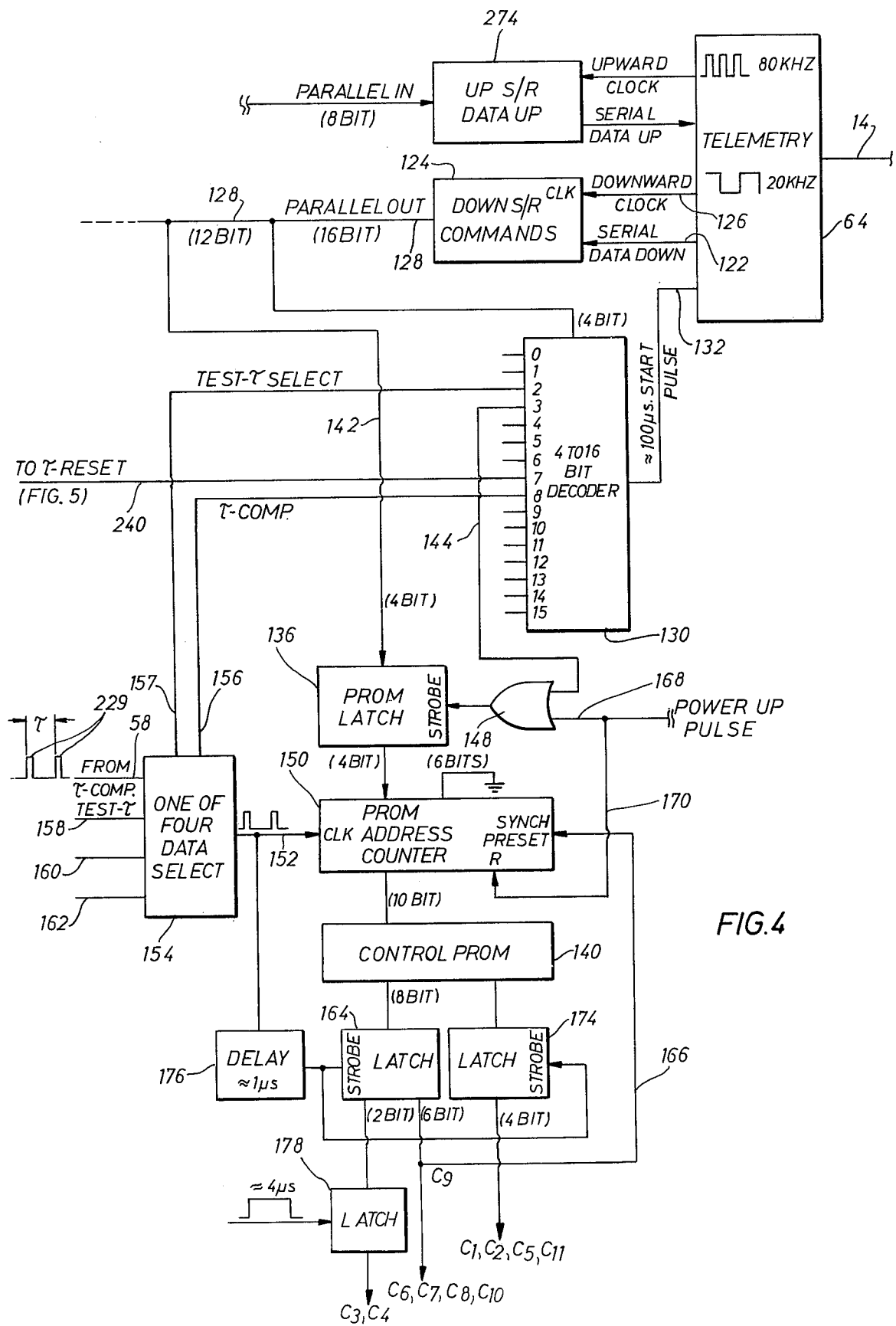
FIG. 4 illustrates circuitry of the invention necessary for timing and controlling the neutron bursts and detection gates as illustrated in FIG. 3.

FIG. 4 specifically describes the circuits and operation of digital logic circuits 51 and the programmer 46. Referring to FIG. 4, the telemetry 64 directs serial downward command data, via a lead 122 to a shift register 124. Likewise a downward clock signal, for example, a 20 kilohertz square wave timing signal, is directed, via lead 126 to the clock input of the shift register 124 for synchronizing the shift register with the serial data input. The downward shift register 124 converts the serial data from the cable 14 to parallel output data on a command bus 128. For example, in a preferred embodiment, 16 bit serial downward commands are applied to the input of the shift register 124, which then applies these as 16 bit parallel output commands to the bus 128. A four to sixteen bit decoder 130 is connected to the bus 128. Four of the sixteen bits in the conductor bundle of the bus 128 are command identification bits. These four bits are those which are directed to the decoder 130.

One other downward signal from the telemetry 64 is used to indicate that a command has been properly received. This is a start pulse (approximately 100 μsecs. long) applied directly to the decoder 130 via a conductor 132 about 100 μsecs. after the last of the 16 serial data bits are applied to the lead 122. The decoder 130 routes the start pulse to one of its 16 decoder output lines based on its decoding of the four identification bits applied thereto.

The remaining 12 bits on the bus 128 are information bits on 12 leads used, for example, to address the PROM's of the programmer, to enable the neutron power source by coded access word, or to control ADC offset, or supply voltages. Relevant to this invention is the application of four of these bits to a latch 136 for addressing the control programmed read only memory (PROM) 140 to instruct selection of the tau determination and capture gamma-ray spectroscopy program of memory 140.

The applicable four bits from the bus 128 are applied, via conductors 142 to the PROM latch 136. Simultaneously, the four identification bits apply the decoder 130 start pulse to decoder output 3 (the decoder's PROM output). Lead 144 applies the pulse to an OR gate 148 connected with the strobe connection of the latch 136 to strobe the four bits into the latch to be held.

A ten bit address counter 150 is connected with the control PROM 140. The control PROM comprises two 1024×8 bit PROM's. The control PROM 140 has been arbitrarily divided into 16 segments, each having the capacity for a 64-word program. The ten bit PROM address counter 150, in the specific example, has its last four inputs connected with the four bit outputs of the latch 136. The first six bits of the PROM address counter 150 are tied low. Hence, PROM address counter begins at a binary address xxxx000000, i.e., 0, 64, 128 . . . 960, where xxxx is the contents of the latch 136.

The program address of the PROM address counter 150 is applied to the control PROM 140 when a clock pulse is applied, via a lead 152 to the clock input of the PROM address counter. These pulses time the counter and hence, the sequencing of the PROM. Clock pulses on lead 152 are applied via a one-of-four data selector circuit 154. Available clock pulses at the data selector circuit 154 can be those pulses 229 derived by the tau computation circuit 56 of FIG. 1 applied by the line 58 to the data selector circuit 154. Alternatively, the data selector 154 can transfer to the clock input PROM address counter 150 test-tau pulses applied to an input line 158, or other timed pulses available on input lines 160 and 162 suitable for use with other programs, e.g., inelastic spectroscopy programs.

Selection among the four input lines 58, 158, 160 and 162 is based on four bit identification delivered from the bus 128 to the decoder 130. For example, the presence of the start pulse on output numbered #8 of decoder 130 results in a pulse on input line 156 of the data selector 154. Therefore, the data selector will select the pulses 229 from the tau computation circuit 56 for repeated, properly timed addressing of the control PROM 140 throughout the tau computation program.

In the specific embodiment of the invention, each of the parallel outputs of the control PROM 140 controls a specific function, such as neutron burst, analog to digital converter enable and, of course, the gates of the 62 tau cycle of FIG. 2. Each clock pulse to the PROM address counter 150 increments the PROM address counter, thereby changing the control PROM outputs to those in the next sequentially stored word. The timing of the pulses 229 will determine the spacing between and the duration of the gates of FIG. 2.

The test-tau circuit applies a test-tau signal on lead 158. The test-tau circuit is a digitally controlled oscillator and substitutes for the tau-computation loop for test purposes. The test-tau mode is selected once the power in the tool 10 is on and before any neutron burst occurs. Periods varying from 5 to 640 μsecs may be selected for use with command #2, the test-tau select command via lead 157, from the decoder 130.

Two latches 164 and 174, receive the twelve bit program output of the PROM. Because the programs available from the control PROM are each ordinarily of a different length, one control PROM output bit (C9) is programmed active in the last word of each logging program. This active bit, deliverd back to the PROM address counter 150 via the latch 164 and a lead 166 causes the program address counter to synchronously preset on the very next clock pulse. Hence, program address counter 150 returns to the program starting address xxxx000000 and begins anew to advance the control PROM 140 through the selected program.

Initially, upon "power-up", the value 0000 is loaded into the PROM latch 136. A power up pulse from telemetry is delivered via lead 168 and the OR gate 148 to the strobe connection of the PROM latch 136 to deliver this initial address to the PROM address counter 150 which has been reset by the power up pulse delivered by a lead 170. Thus the control PROM 140 begins in program "0". This may be a calibration program, for example, for gain and analog to digital converter offset adjustment, and it provides no neutron pulses. The control PROM 140 recycles in program "0" until another address is provided thereto.

For tau logging, the tau computation circuit 56 or "tau-loop" is selected by the decoder 130 once the neutrons are on. The control PROM outputs $C_1$–$C_{12}$ are provided to the latches 164 and 174, and these are provided as outputs from the latches upon strobing thereof by the pulses from the data selector 154, delayed approximately 1 $\mu$sec by a delay circuit 176. For the tau computation and capture gamma-ray spectroscopy functions, the program address counter 150 advances the PROM 140 once each tau, as timed by the pulses 229 delivered to the control PROM 140 by the data selector 154 on the output lead 152.

Likewise, the 12 bit PROM outputs are strobed from the latches 164 and 174 once each tau. Two output bits, $C_3$, $C_4$ of the latch 164 are applied to a further latch 178. These control the address of the random access memory (not shown), wherein the output of the analog to digital converter 45 of FIG. 1 is stored. A 4 $\mu$sec delay pulse is applied to latch 178 to prevent the analog to digital converter's output being incorrectly recorded in the RAM of the digital logic circuits 51. That is, the extra latch 178 prevents the two high-order RAM address bits, $C_3$, $C_4$ from changing while the ADC is busy converting a gamma-ray analog detection signal to its digital form.

Figure 5:
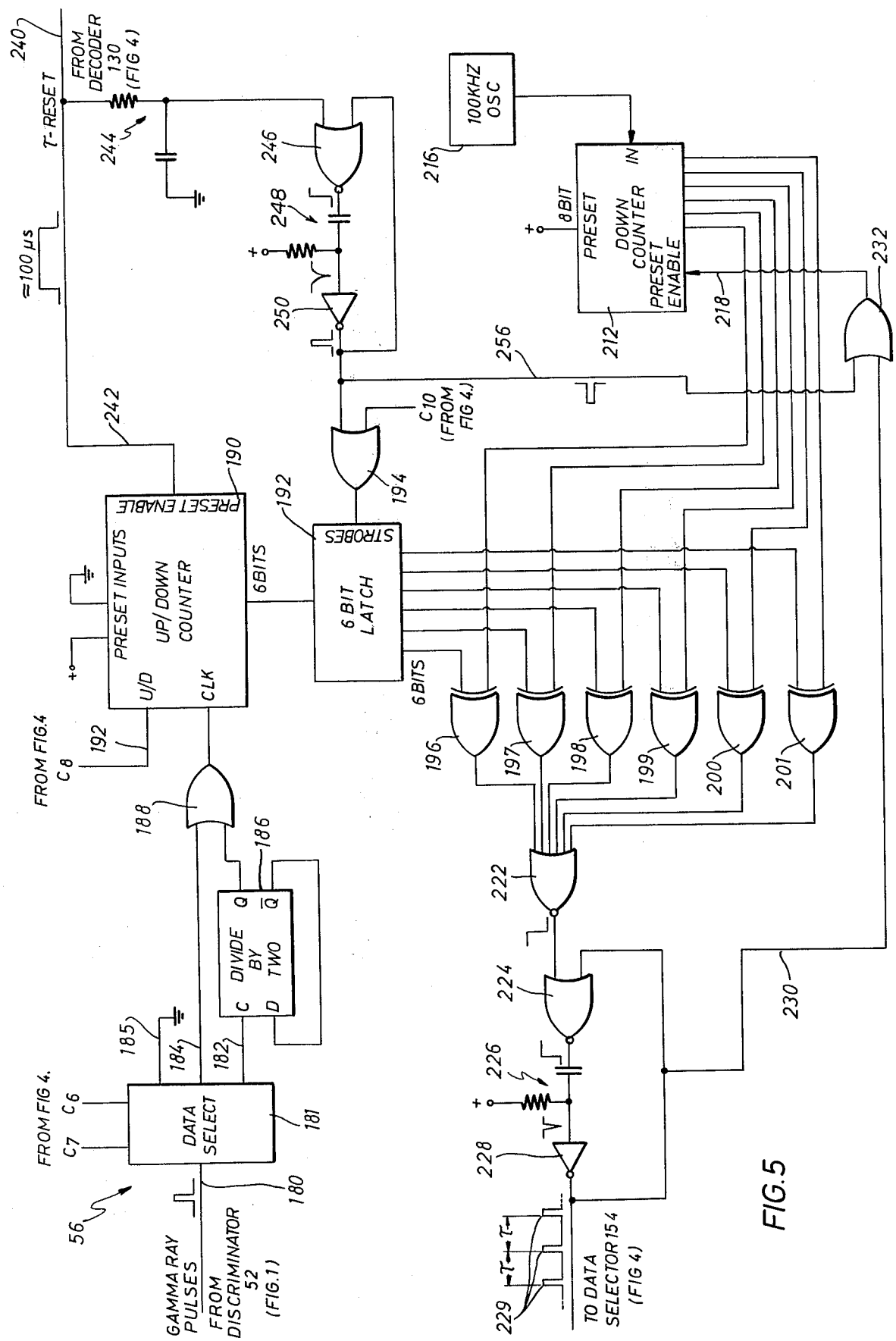
FIG. 5 illustrates logic circuitry for determining the value of tau from gated measurements of capture gamma-rays following a series of neutron bursts.

Referring to FIG. 5, the tau computation circuitry 56 receives gamma ray-produced input pulses via lead 180 from the pulse discriminator circuit 52 of FIG. 1. These are supplied to a data selector circuit 181 arranged to apply the pulses to one of three output leads 182, 184 or 185 under the control of the control PROM 140 (FIG. 4) outputs $C_6$ and $C_7$. Pulses detected during each tau determination gate I are applied to the output lead 182 and divided by two by a D-flip-flop 186 that has its output connected to an OR gate 188. Pulses detected during the tau determination gates II and III are applied directly to the OR gate 188 from the data select output lead 184. The output of the OR gate 188 is connected to the clock input of an up/down counter 190 that counts up or down as commanded by a further control PROM 140 output $C_8$ that is applied to the up/down counter control connection by a lead 192.

Upon receipt of a high signal $C_8$, the counter 190 counts up. For example, pulses received during each gate I are divided by two by the flip-flop 186 and applied as clock inputs to the counter 190 by the OR gate 188 and there counted up. Once the PROM program has made output $C_8$ low, at the beginning of each gate II, pulses detected throughout the gate II are applied by the OR gate 188 to the counter 190 and are counted down to subtract these from the previous gate I count. This occurs for each of the eight I and II gates in the 62 tau cycle. During intervening intervals (see FIG. 2), pulses from the discriminator 52 (FIG. 1) are discarded by conduction to ground at lead 185, again under the control of the control PROM 140. Finally, pursuant to equation (1) above, and after the eight occurrences of gates I and II, the number of detections in the long III background gate is counted up. The net count, which appears in binary form at the output of the up/down counter 190 affects the determination of tau. Unless the N of equation (1) is 0, the count N represents an error (too short or too long) in the tau currently being employed.

The counter 190 has a 12 bit output ($Q_0$–$Q_{11}$), of which six bits ($Q_5$–$Q_{10}$) are applied to a latch 192. A command $C_{10}$ of the control PROM 140 (FIG. 4) applied to the strobe input of the latch 192 by an OR gate 194, strobes the digital count of the up/down counter 190 into the latch for storage at the inputs to 6 dual input Exclusive-OR gates 196–201. One bit of the six bit count is applied to one of the two inputs of each of the six Exclusive-OR gates. A down counter 212 has the six lowest bits of its eight outputs connected one to each of the remaining inputs of the six Exclusive-OR gates. The outputs of the down counter 212 are preset to all binary 1's. A 100 KHz oscillator 216 is connected to the input or clock connection of the down counter 212. Upon application of an input to a preset enable connection of the counter 212, via a lead 218, the six output bits return to their preset condition (all 1's) and then count down at the 100 KHz rate.

The outputs of the six Exclusive-OR gates 196–201 are connected to a NOR gate 222. This NOR gate is connected to a "one-shot" circuit comprising NOR gate 224, a differentiating circuit 226, and an inverter gate 228.

As described below, the pulses 229 are generated at the output of the inverter gate 228. These pulses are transmitted via a conductor 230 to an OR gate 232. The output of the OR gate 232 provides the preset enable input to the down counter 212 via the lead 218. The pulses 229 are spaced one unit of tau apart and are applied to the data selector 154 of FIG. 4 at its input lead 58 to time the PROM address counter 150 and control PROM 140 when the tau computation selection is made by the four to sixteen bit decoder 130 as described hereinabove.

If the equation (1) above results in N≠0, an error signal in digital form is added to or substracted from the count in the up/down counter 190, as applied to the six Exclusive-OR gates 196–201. Until the count applied to the Exclusive-OR gates from the down counter 212 is exactly the same as that applied thereto from the output of the up/down counter 190, one or more Exclusive-OR gates will have a high output. The NOR gate 222, in that case, will have a low output, the NOR gate 224 will have a high output and until that becomes low, no pulse will appear at the output of the differentiating circuit 226 or at the output of inverter gate 228.

When the inputs to the Exclusive-OR gates match, the output of the Exclusive-OR gates will all be low, the NOR gate 222 output will be high, the output will be high, the output of the NOR gate 224 will go to low, and that change will produce a pulse from the differentiating circuit. The inverter gate will produce a clipped pulse 229, approximately 2 μsecs long. At that time, by virtue of the tau pulse 229 being returned via the lead 230 and the OR gate 232, the down counter outputs will be reset to all digital 1's and the counter will count down at the 100 KHz rate of the oscillator 216. The pulses 229 will continue to be produced when the inputs to the Exclusive-OR gates match.

During the 62 tau period using the pulses 229, the up/down counter 190 again will count detections in the I, II and III gates, adding and substracting detections from the previous count. If at the end of that cycle N≠0, then the value of N will increase or decrease the previos up/down counter value to further correct tau. The corrected count will be strobed into the latch 192, and the tau pulses 229 will adjust accordingly. When the output of the up/down counter 190 is no longer altered, tau is correct.

A tau reset input to the tau computation circuit 56 includes a lead 240. This receives approximately 100 μsec tau reset pulse from the output #7 of the decoder 130 in FIG. 4, when the four bit instruction to the decoder from the ground station contains the tau reset instruction. The preset input connections of the up/down counter 190 are wired so as to set the counter outputs at tau=100 μsec as the tau reset pulse is transmitted to the preset enable connection of the counter 190 by lead 242. The reset pulse is delayed by the RC circuit 244, then applied to an input of a NOR gate 246. The output of the NOR gate 246 goes low, producing a negative going spike from a differentiating circuit 248 which in turn becomes an approximately 2 μsec pulse at the output of an inverter gate 250. This pulse is applied to another input of the OR gate 194 to strobe the digital output of the counter 190 into the latch 192. The 100 μsec tau preset figure is thus applied to the input of the six Exclusive-OR gates 196–201.

The approximately 2 μsec pulse at the output of the inverter 250 is returned by a lead 256 to the remaining input of the OR gate 232 to enable preset of the down counter 212. The down counter 212 begins its count down at the rate provided by the 100 KHz oscillator 216. When the counter reaches the same digital count as that which has already been applied to the Exclusive-OR gates, a first tau determination pulse will occur at the output of the inverter 228 as described above. The tau computation and capture gamma-ray spectroscopy function will proceed on the basis of a 100 μsec tau period for the first 62 tau cycle, at which time the up/down counter will have been provided with sufficient informtion from the detector 26 during the tau gates I, II and III to provide a first tau-adjusting signal at its outputs. Correction of tau will proceed as described above.

The tau reset command is sent from the ground level station when the initial tau computation is begun, or when it is noticed that tau has become too long to be accurate. This observation can be made by an operating engineer or by suitable ground station software.

Returning to FIG. 4, parallel digital data gathered downhole is directed to a shift register 274 and then serially to the telemetry 64 at an appropriate upward clock rate, e.g., 80 KHz, where the telemetry circuits disclosed in the aforementioned U.S. application Ser. No. 872,504 are used. The data is that taken from the memory (RAM) of the digital section 51 (FIG. 1), such as the digitally described capture gamma ray spectra, as well as a count of tau pulses 229 and indicators of power source operating voltages and the like. Multiplexing, time sharing and other arrangements for transmitting the data upward on the logging cable are known, for example, from the aforesaid U.S. application Ser. No. 872,504.

From the foregoing, it will be seen that a method and apparatus for very accurate measurement of tau is provided in accordance with this invention, giving improved capture gamma spectroscopy related analysis as well as better tau related data. Although specific processes and embodiments have been described herein, these are illustrative only and not intended to limit the spirit or scope of the invention as set forth in the appended claims.

What is claimed is:

1. Apparatus for investigating an earth formation traversed by a well bore, comprising:
    means for cyclically irradiating the formation with a number of time-spaced pulses of fast neutrons;
    means for obtaining representations of the energies of gamma rays produced by thermal neutron capture interaction with nuclei of the formation during a first detection period followng each of the neutron pulses;
    means for obtaining representations of the number of gamma rays produced by thermal neutron capture interactions with nuclei of the formation during a second detection period following each of the neutron pulses;
    means for obtaining representations of the number of background gamma rays detected during a period following the second detection period after the last pulse of fast neutrons in each cycle of neutron pulses;
    means for deriving a measurement of a neutron characteristic of the formation from accumulated counts of the gamma rays measured during the second detection period and the background gamma ray detection period; and
    means for controlling the timing of the pulses of fast neutrons and the detection periods as a function of the measurement of the neutron characteristic of the formation derived from the preceding cycle of pulse irradiations, measurements and derivations.

2. The apparatus of claim 1 further comprising:
    means for obtaining representations of the energies of background gamma rays detected during a spectral background period after the last pulse of fast neutrons in the cycle of neutron pulses; and
    means for subtracting the energy spectra of the spectral background period from the energy spectra obtained from the first detection periods following each of the neutron pulses in the cycle.

3. The apparatus of claim 2 wherein:
    said second detection period is subdivided into two decay time periods, gate I and gate II; and
    the neutron characteristic of the formation derived is the thermal decay time of the formation obtained from accumulated counts of the gamma rays during gates I and II and the background gamma ray detection period.

4. In apparatus for investigating earth formations traversed by a well bore of the type including a well tool adapted to be moved through the well bore, neutron burst producing means carried by the well tool for irradiating the formation and other well bore media surrounding the well tool with cycles of time-spaced bursts of fast neutrons, and detector means carried by the well tool for detecting gamma rays resulting from neutron interactions with nuclei of the formation and for generating corresponding signals representative of the energies of the detected gamma rays; the improvement comprising:

means for obtaining representations of the number of gamma rays produced by thermal neutron capture interactions with nuclei of the formation during a tau detection period following each of the bursts of fast neutrons;

means for obtaining representations of the number of background gamma rays detected during a background period after the last burst of fast neutrons in each cycle of neutron bursts; and means for deriving a measurement of a neutron characteristic of the formations from accumulated counts of the gamma rays measured during the tau detection periods and the background period; and means for controlling the timing of the burst of fast neutrons, the tau and background detection periods and the detector means for generating signals representative of the energies of the detected gamma rays, as a function of the measurement of the neutron characteristic of the formtion derived from the preceding cycle of pulse irradiations, measurements and derivations.

5. The apparatus of claim 4 further comprising means for obtaining representations of the energies of background gamma rays detected during a spectral background period after the last pulse of fast neutrons in the cycle of neutron pulses.

6. In apparatus for investigating earth formations traversed by a well bore of the type including a well tool adapted to be moved through the well bore, neutron burst producing means carried by the well tool for irradiating the formation and other well bore media surrounding the well tool with cycles of time-spaced bursts of fast neutrons, and detector means carried by the well tool for detecting gamma rays resulting from neutron interactions with nuclei of the formation and for generating corresponding signals representative of the energies of the detected gamma rays; the improvement comprising:

means for generating gamma ray count signals during plural sets of first and second tau gates, each set occurring after each of a predetermined plural number of neutron bursts by the neutron burst producing means;

means for generating the signals representative of energies of the detected gamma rays during spectroscopy gates occurring between bursts of the predetermined plural number of bursts; and circuit means responsive to the gamma ray count signals for generating a signal proportionally representative of the thermal neutron decay time tau of the formation.

7. Apparatus of claim 6 further including: means for generating background gamma ray count signals during a long background detection period after the last burst of fast neutrons in the cycle of neutron bursts, and means for directing background signals representing detections of radiation during the long background period to the circuit means for background correction of the gamma ray count signals generated during the sets of first and second tau gates.

8. Apparatus of claim 6 further comprising means for timing the bursts by the neutron burst producing means and for timing the tau computation periods based on the signal proportional to tau generated from the preceding cycle of neutron bursts.

9. Apparatus of claim 8 wherein generating means includes:

a programmer for controlling the occurrence of bursts of neutrons from said burst producing means and for controlling the occurrence of tau gates in a cycle including the predetermined plural number of said bursts and the plural sets of said tau gates, and timing means for advancing the programmer at a rate dependent on the signal proportional to tau.

10. Apparatus of claim 9, wherein the circuit means including the programmer and timing means are disposed in the well tool.

11. Apparatus of claim 9 wherein:

the programmer controls each first tau gate to provide an intervening period between each of the plural bursts and each first tau gate, and to produce each first tau gate with a first duration, and controls each second tau gate to occur after each first tau gate and with a longer duration than that of said first tau gate, and circuit means includes means for dividing the number of accumulated gamma ray count signals produced during the first tau gates, means for counting the divided signals, means for subtracting the number of signals accumulated during said second tau gates from the count of divided first gate signals to generate a subtraction signal, and means for generating background gamma ray count signals during a long background period after the last burst of fast neutrons in the cycle of neutron bursts and applying said background signals to the circuit means for correction of the subtraction signal.

12. Apparatus of claim 11, wherein circuit means further includes an up/down counter, and the means for generating gamma ray signals provides said signals accumulated during said first tau gates to said means for dividing, said means for dividing being connected to the up/down counter, and said programmer including output means for directing said up/down counter to count in one direction only upon receipt of divided first tau gate signals;

said generating means being connected to said up/down counter for providing signals derived during the second tau gates directly thereto, and said programmer output means being connected with said up/down counter for causing said counter to count in the direction opposite to said one direction when signals generated during the second tau gates are applied thereto; and means for directing background signals to said up/down counter for correction of the total count resulting from counting up and down during the first and second tau gates.

13. Apparatus of claim 12 wherein said up/down counter retains the gamma ray counts derived during a preceding cycle of neutron bursts, and adds during the next subsequent cycle the count derived during the tau gates and background gate periods of the subsequent cycle to correct the tau signal represented by the count of the preceding cycle.

14. A method of investigating an earth formation traversed by a well bore, comprising:

cyclically irradiating the formation with a number of time-spaced pulses of fast neutrons;

obtaining representations of the energies of gamma rays produced by thermal neutron capture interactions with nuclei of the formation during a first detection period following each of the neutron pulses;

obtaining representations of the number of gamma rays produced by thermal neutron capture interactions with nuclei of the formation during a second detection period following each of the neutron pulses;

obtaining representations of the number of background gamma rays detected during a period following the second detection period after the last pulse of fast neutrons in each cycle of neutron pulses;

deriving a measurement of a neutron characteristic of the formation from accumulated counts of the gamma rays measured during the second detection periods and the background gamma ray detection period, and controlling the timing of the pulses of fast neutrons and the detection periods as a function of the measurement of the neutron characteristic of the formation derived from the preceding cycle of pulse irradiations, measurements and derivations.

15. The method of claim 14 further comprising:

obtaining representations of the energies of background gamma rays detected during a spectral background period after the last pulse of fast neutrons in the cycle of neutron pulses, and subtracting the energy spectra of the spectral background period from the energy spectra obtained from the first detection periods following each of the neutron pulses in the cycle.

16. The method of claim 15 wherein:

said second detection period is subdivided into two decay time periods, gate I and gate II; and the neutron characteristic of the formation derived is the thermal decay time of the formation obtained from accumulated counts of the gamma rays during gates I and II and the background gamma ray detection period.

17. The method of claim 16 wherein:

each cycle of neutron bursts has eight neutron bursts, each of one tau unit long and spaced from each other by five tau units, the cycle period being 62 tau units long, the first detection period following each of the neutron pulses in the cycle is each two tau units long and follows the termination of each neutron pulse after a delay of one tau unit;

the gate I and gate II of the second detection period being contiguous with gate I beginning after a delay of two tau units after the termination of each neutron burst and lasting for one tau unit, gate II beginning three tau units after the termination of each neutron burst and lasting for two tau units long; and the tau decay time background period begins six tau units after the last neutron pulse in the cycle and lasts for 12 tau units long.

18. The method of claim 17 wherein the spectral background period begins five tau units after the last neutron pulse in the cycle and lasts for 13 tau units long.

19. Apparatus for investigating an earth formation traversed by a well bore, comprising:

means for irradiating the formation with time-spaced pulses for fast neutrons, the pulses occurring in predetermined cycles;

means for detecting emissions from the formation resulting from the irradiation thereof with the pulses of fast neutrons;

timing means for placing a plurality of emission detection gates in each interval between the neutron pulses in the cycle;

means for obtaining representations of the energies of gamma rays produced by thermal neutron capture interaction with nuclei of the formation during a first series of gates in the intervals;

means for deriving a neutron characteristic indication of the formation based on emission counts during a second series of gates in the intervals; and means for altering the timing and duration of each of the gates in a cycle based on the neutron characteristic derived during the preceding cycle.

20. The apparatus of claim 19 further comprising:

means for applying a background correction count to the means for deriving a neutron characteristic to compensate for background emission detections accumulated during said plurality of emission detection gates in the cycle.

21. The apparatus of claim 19, wherein:

the means for deriving a neutron characteristic includes a counter responsive to numbers of emissions detected by said detection means;

the means for obtaining representations of the energies includes means for producing electrical indications of the energies of emissions detected by said detection means and means for transmitting the electrical indications from within the well bore;

the timing means includes a programmer, said programmer being operatively connected to the means for obtaining representations of the energies to establish as said first series of gates a spectral gate after each neutron pulse;

said programmer being operatively connected to the means for deriving a neutron characteristic to establish as said second series of gates a first gate I and a second gate II after each neutron pulse by connecting the counter to the detection means for counting; and the means for altering the timing including means responsive to the counter for changing the duration of events controlled by the programmer, including said I, II and spectral gates.

22. The apparatus according to claim 21, wherein:

the programmer is operatively connected to the means for irradiating to control the timing and duration of each neutron pulse;

the programmer comprises means for initiating eight neutron pulses each having the same pulse duration spaced by intervals of five pulse durations, eight gates I beginning two pulse durations after each pulse and being one pulse duration long, eight gates II beginning immediately after each gate I and being two pulse durations long, and eight spectral gates beginning one pulse duration after each pulse and being two pulse durations long.

23. The apparartus according to claim 22, wherein the programmer further comprises:

means operatively connecting the counter to the detection means during a long background gate III beginning after the eighth pulse and of a duration to provide background emission counts substantially equal to background emission counts accumulated by the counter during the preceding eight gates I and II; and means for operatively connecting the means for obtaining representations of the energies of the emission detection means to establish a long background spectral gate after the eighth pulse of a duration to provide background emission energy data representative of background emission energy data supplied to the means for producing electrical indications of the energies during the preceding eight spectral gates.

24. The apparatus according to claim 22, wherein the neutron characteristic is thermal neutron decay time, tau;

said counter comprises means for adding to and subtracting from a preceding count therein;

the means responsive to the counter for changing the duration includes a pulse circuit connected to the counter and includes means for controlling the timing of pulses from the pulse circuit in dependence on the preceding count;

and means connecting the pulse circuit to the programmer to advance the programmer at a rate controlled by the pulses from the pulse circuit.

25. The apparatus according to claim 24, wherein:

the pulse circuit includes a comparison network of logic gates, means for providing the preceding count to inputs of the logic gates, a second counter for counting in one direction only at a predetermined rate and having outputs thereof connected to further inputs of the logic gates to provide a pulse-producing change of output state from the comparison network when the second counter output matches said preceding count;

and means for resetting the second counter upon each pulse-producing change of state.

26. The apparatus according to claim 25 wherein:

the counter of said timing means is an up/down counter;

the programmer is connected to the up/down counter to direct the up/down counter to count up during one of the gates I and II and to count down during the other of the gates I and II to add and subtract counts from the preceding count.

27. The apparatus according to claim 26 wherein the timing means includes means to divide by two the emission indications counted by the counter during the gates I.

28. The apparatus according to claim 27 wherein, when said neutron pulse duration equals tau, the total counts added or subtracted from the preceding count during an entire cycle is substantially zero.

29. The apparatus according to claim 28 wherein: all of the means for irradiating, means for detecting, programmer, pulse circuit, up/down counter, and means for dividing are housed in a well tool adapted for movement within a well bore; whereby tau determination is accomplished within the bore.

30. The method of investigating an earth formation traversed by a well bore, comprising:

irradiating the formation with time-spaced pulses of fast neutrons, the pulses occurring in predetermined cycles;

detecting emissions from the formation resulting from the irradiation thereof with the pulses of fast neutrons;

placing a plurality of emission detection gates in each interval between the neutron pulses in the cycle;

obtaining representations of the energies of gamma rays produced by thermal neutron capture interaction with nuclei of the formation during a first series of gates in the intervals;

deriving a neutron characteristic indication of the formation based on emission counts during a second series of gates in the intervals; and altering the timing and durtion of each of the gates in a cycle based on the neutron characteristic derived during the preceding cycle.

31. The method of claim 30 further comprising:

applying a background correction count in the step of deriving a neutron characteristic to compensate for background emission detections accumulated during said plurality of emission detection gates in the cycle.

32. The method of claim 30, wherein:

the step of deriving a neutron characteristic includes counting numbers of emissions detected by a detection means with a counter responsive to emission detections;

the step of obtaining representations of the energies includes producing electrical indications of the energies of emissions detected by the detection means, and transmitting the electrical indications from within the well bore;

the step of obtaining representations of the energies includes establishing as said first series of gates a spectral gate after each neutron pulse;

the step of placing emission detection gates includes establishing as said second series of gates a first gate I and a second gate II after each neutron pulse by connecting the counter to the detection means for counting; and the step of altering the timing includes changing the duration of events in a cycle, including said I, II and spectral gates in response to the emission detections counted by the counter.

33. The method according to claim 32, wherein the step of altering the timing includes:

controlling the timing and duration of each neutron pulse by initiating eight neutron pulses each having the same pulse duration spaced by intervals of five pulse durations;

placing eight gates I beginning two pulse durations after each pulse and being one pulse duration long;

placing eight gates II beginning immediately after each gate I and being two pulse durations long; and placing eight spectral gates beginning one pulse duration after each pulse and being two pulse durations long.

34. The method according to claim 33, wherein the step of timing further comprises:

operatively connecting the counter to the detection means during a long background gate III beginning after the eighth pulse and of a duration to provide background emission counts substantially equal to background emission counts accumulated by the counter during the preceding eight gates I and II; and operatively connecting a means for obtaining electrical representations of the energies to the detection means to establish a long background spectral gate after the eighth pulse of a duration to provide background emission energy data representative of background emission energy data accumulated during the step of producing electrical indications of the energies in the preceding eight spectral gates.

35. The method according to claim 33, wherein the neutron characteristic is thermal neutron decay time, tau;
said step of counting includes adding to and subtracting from a preceding count on the counter;
the step of controlling the timing and duration includes providing a pulse circuit connected to the counter, controlling the timing of pulses from the pulse circuit in dependence on the preceding count, and timing the events in a cycle at a rate controlled by pulses from the pulse circuit.

36. The method according to claim 35, wherein:
the pulse circuit includes a comparison network of logic gates, and the step of controlling the timing of pulses includes providing the preceding count to inputs of the logic gates, providing a second counter for counting in one direction only at a predetermined rate and having outputs thereof connected to further inputs of the logic gates, generating a pulse-producing change of output state from the comparison network when the second counter output matches said preceding count, and resetting the second counter upon each pulse-producing change of state.

37. The method according to claim 36 wherein:
the counter of said timing means is an up/down counter;
the step of controlling the timing and duration includes directing the up/down counter to count up during one of the gates I and II and to count down during the other of the gates I and II to add and substract counts from the preceding count.

38. The method according to claim 37 wherein the step of timing includes dividing by two the emission indications counted by the counter during the gates I.

39. The method according to claim 38 wherein, when said neutron pulse durtion equals tau, the total counts added or subtracted from the preceding count during an entire cycle is substantially zero.

40. The method according to claim 39 wherein all the steps of irradiating, detecting, and timing, occur in a well tool adapted for movement within a well bore; whereby tau determination is accomplished within the bore.

* * * * *